(12) United States Patent
Lehman et al.

(10) Patent No.: US 6,251,499 B1
(45) Date of Patent: Jun. 26, 2001

(54) CORRUGATED STRIP FOR CROSS-CORRUGATED PACKING AND ITS USE IN ON-BOARD DISTILLATION COLUMNS

(75) Inventors: Jean-Yves Lehman, Maisons-Alfort; Etienne Werlen, Versailles, both of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/193,120

(22) Filed: Nov. 17, 1998

(30) Foreign Application Priority Data

Nov. 17, 1997 (FR) .................................................. 97 14381

(51) Int. Cl.⁷ ..................................................... B32B 3/28
(52) U.S. Cl. ........................... 428/182; 428/183; 428/184; 261/112.2; 261/DIG. 72
(58) Field of Search ...................................... 428/174, 177, 428/182, 183, 184; 241/112.2, DIG. 72

(56) References Cited

U.S. PATENT DOCUMENTS

| | | | |
|---|---|---|---|
| 3,526,393 | 9/1970 | Meek | 261/112 |
| 4,800,047 | * 1/1989 | Monjoie | 428/184 |
| 5,632,934 | 5/1997 | Billingham et al. | 261/112.2 |

FOREIGN PATENT DOCUMENTS

| | | |
|---|---|---|
| 11 95 779 | 7/1965 | (DE) . |
| 0 273 191 | 7/1988 | (EP) . |
| WO 84/04048 | 10/1984 | (WO) . |

* cited by examiner

Primary Examiner—Donald J. Loney
(74) Attorney, Agent, or Firm—Young & Thompson

(57) ABSTRACT

This corrugated strip comprises on its lower edge, in front view, at least one downwardly projecting motif (9) whose contour is such that, if $\alpha_m$ and $\alpha_M$ designate the ends of the algebraic value of the angle that the tangent to the contour forms with the horizontal direction, then $$-\alpha_m > \alpha_0 \text{ and } \alpha_M > \alpha_0,$$

wherein $\alpha_0$ designates a predetermined angle at least equal to 5°. The corrugated is particularly useful in air distillation columns on board floating oil platforms or barges.

8 Claims, 2 Drawing Sheets

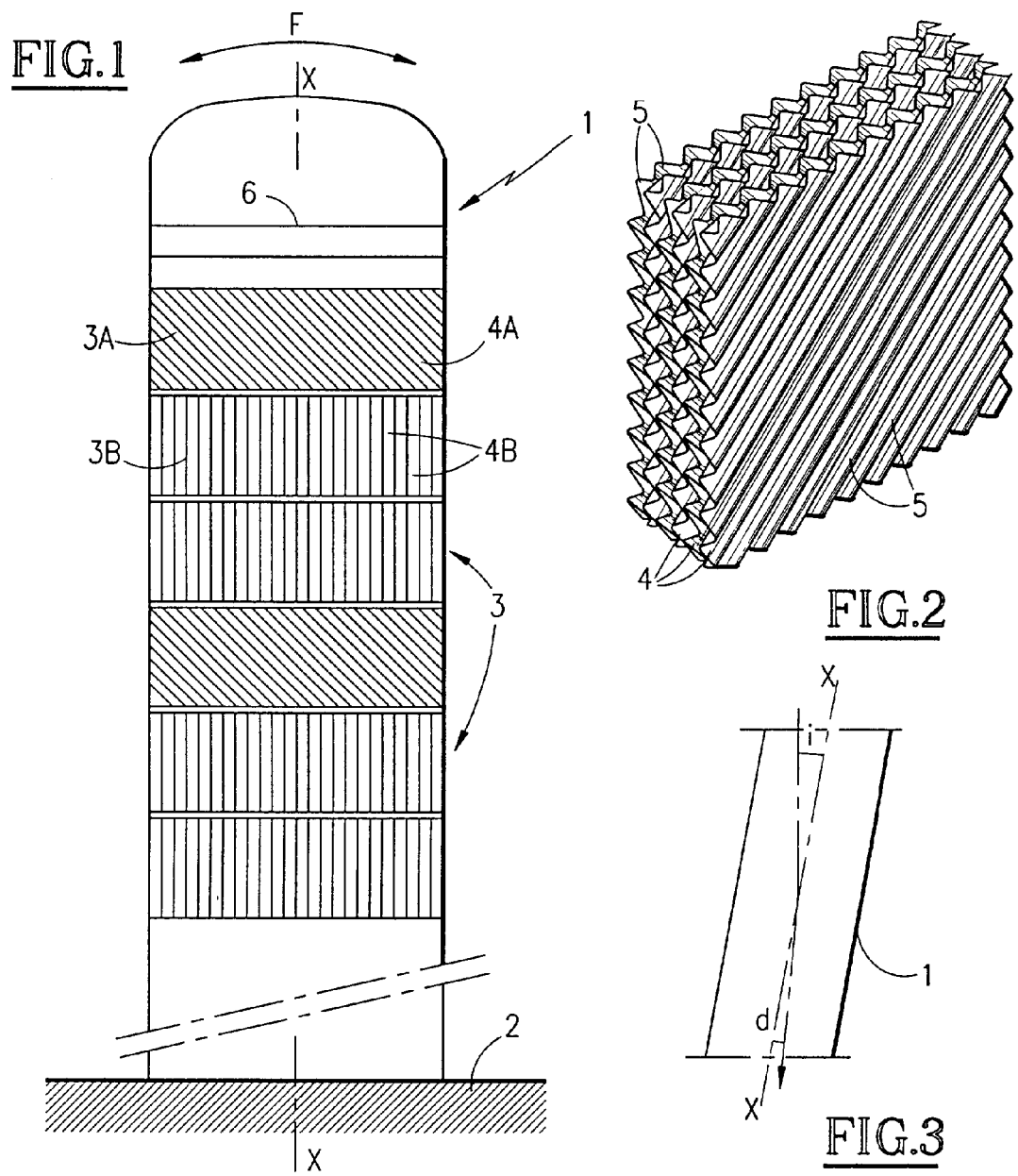
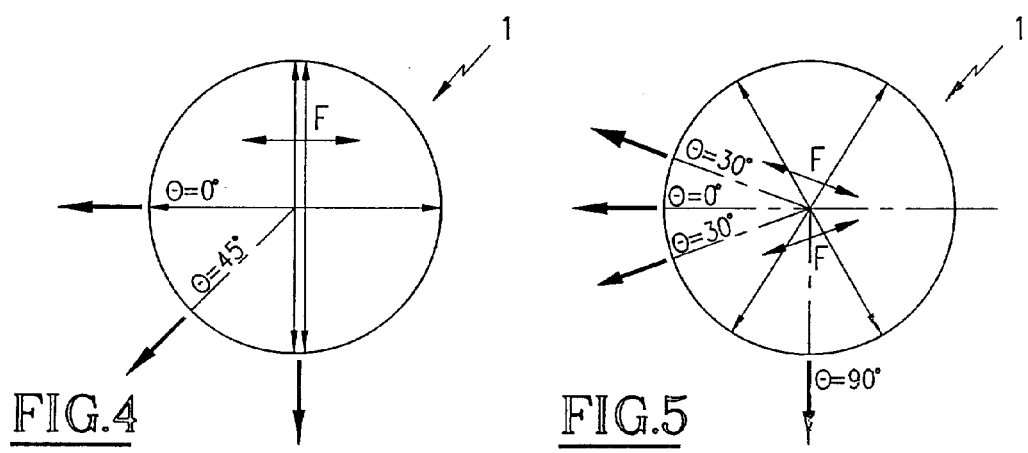

US 6,251,499 B1

CORRUGATED STRIP FOR CROSS-CORRUGATED PACKING AND ITS USE IN ON-BOARD DISTILLATION COLUMNS

FIELD OF THE INVENTION

The present invention relates to cross-corrugated packing. It is applicable particularly to air distillation columns on board floating oil platforms or on barges.

BACKGROUND OF THE INVENTION

As is well known, cross-corrugated packing is used in certain distillation columns in place of distillation plates, to ensure material and heat exchange between a rising gas and a falling liquid. These cross-corrugated packings are constituted by a superposition of sections. Each section is formed by a stack of corrugated strips each disposed in a ith generally vertical plane, one against the others. The corrugations are oblique and descend in opposite directions from one strip to the next.

The strips generally comprise dense small diameter perforations, with a perforation proportion of about 10l, to permit the liquid to flow on opposite sides of the corrugated strips.

British 1,004,046 and Canadian 1,095,827 disclose such cross-corrugated packings.

A cross-corrugated packing is generally produced from a flat product, namely metallic sheets in the form of strips. The strips are first bent (or folded) so as to form a corrugated metal sheet in a strip whose corrugations are oblique relative to the axis of the strip. The bent strips are then cut off in sections, then stacked alternately reversed. The packing sections thus obtained are often called "packs".

WO-A-90/10 497 discloses among other things a packing analogous to the mentioned cross-corrugated packings, but perforated in a different way. The term "cross-corrugated packing" used here also comprises such a packing, as well as any analogous packing.

Oil platforms at sea produce residual gases. For economic and environmental reasons, it is becoming more and more necessary to recover these gases, one method consists in their conversion into heavier hydrocarbons, in liquid form and hence more easily transportable, by the Fischer-Tropsch process, which consumes large quantities of oxygen.

SUMMARY OF THE INVENTION

The basic problem that the invention seeks to solve consists in providing an air distillation column capable of operating in satisfactory conditions on board a platform or a barge, which is to say in the presence of oscillations due to swell and whose amplitude is typically comprised between 5° and 10° in all directions. It is thus imperative that the liquid distributed at the head of the column ensures substantially uniform wetting of the packing over all the cross section of the column despite the mentioned oscillations.

To this end, the invention has for its object a corrugated strip for cross-corrugated packing, characterized in that it comprises on its lower edge, in front view, at least one downwardly projecting motif whose contour is such that, if $\alpha_m$ and $\alpha_M$ indicate the extremes of the algebraic value of the angle that the tangents to the contour form with the horizontal direction, then $$-\alpha_m > \alpha_0 \text{ and } \alpha_M > \alpha_0,$$

in which ai designates a predetermined angle at least equal to 5°.

The corrugated strip according to the invention can comprise one or several of the following characteristics:

the motif repeats a plurality of times along the lower edge of the strip, the motifs being adjacent each other or separated by substantially rectilinear segments;

each motif is obtained by bending a flat strip according to a corrugation of a height H, an opening angle γ and a radius r at the summit of the bend, with the bend generatrices inclined at an angle δ seen face on, the parameters H,γ, r and δ being selected such that $$\frac{\sin\delta \cdot \tan\mu \cdot \sin\left(\frac{\gamma}{2}\right) + \cos\delta}{\sqrt{1 + \tan^2\mu \cdot \sin^2\left(\frac{\gamma}{2}\right)}} < \cos\alpha_0,$$

wherein, $$\tan\mu = \tan\delta \cdot \frac{\left[r \cdot \sin\left(\frac{\gamma}{2}\right) + \frac{H}{2} - r\right] + \frac{\pi}{180} \cdot \left(90 - \frac{\gamma}{2}\right) \cdot \cos\left(\frac{\gamma}{2}\right) r}{\sin\left(\frac{\gamma}{2}\right) \cdot \left[r \cdot \sin\left(\frac{\gamma}{2}\right) + \frac{H}{2} - r\right] + \cos^2\left(\frac{\gamma}{2}\right) \cdot r}$$

each motif is obtained by cutting out two recesses in the lower edge of the strip before bending the latter.

The invention also has for its object a cross-corrugated packing section comprising a stack of corrugated strips of which at least one is as defined above, with their corrugations inclined alternately in opposite directions.

The invention also has for its object a distillation column which comprises a superposition of sections of cross-corrugated packing having at least two different angular orientations, at least one of the sections being as defined above, and in which there is at least one direction such that the mean of the cosines of the angles which comprise the assembly of the strips of the section in each direction, the cosines being given an absolute value, is less than 0.5.

When the column is on board a floating structure having a preferred direction of oscillation, which is generally the case with barges, said direction is this preferred oscillation direction.

In particular, in one embodiment, the superposition of the sections is constituted by sections of strips parallel to the preferred direction of oscillation and of sections with strips perpendicular to this direction, the number of these latter being comprised between about ⅔ and ¾ of the total number of sections of said superposed sections.

BRIEF DESCRIPTION OF THE DRAWINGS

Examples of embodiment of the invention will now be described with respect to the accompanying drawings, in which:

FIG. 1 shows schematically, in partial axial cross section, a distillation column according to the invention;

FIG. 2 shows in perspective a portion of a section of cross-corrugated packing;

FIG. 3 shows schematically in perspective an inclined distillation column;

FIG. 4 shows schematically the arrangement of the column of FIG. 1;

FIG. 5 shows a modification, schematically in an analogous manner;

FIG. 7 shows a corrugated strip of the packing, seen face on;

DETAILED DESCRIPTION OF THE INVENTION

Figure 6:
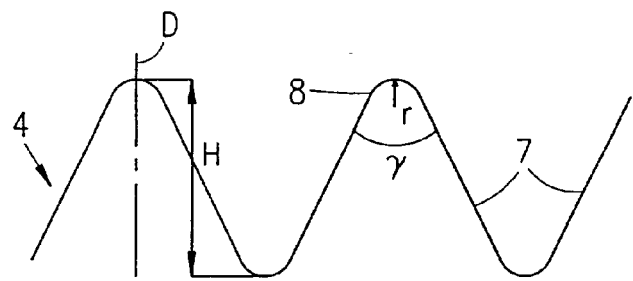
FIG. 6 shows the shape of the corrugation of the cross-corrugated packing of FIG. 2.
Figure 7:
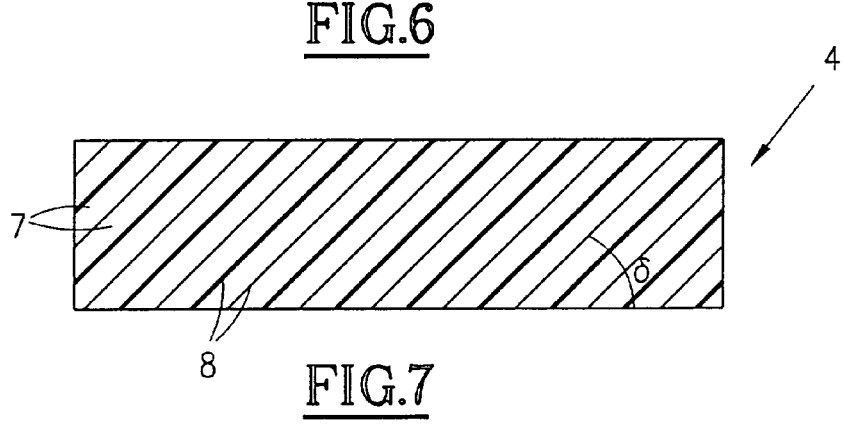

FIG. 1 shows schematically an air distillation column 1 secured to a barge 2 anchored to the bottom of the sea. This barge, under the influence of swell, oscillates with a preferred direction of oscillation, shown by the double arrow F and contained within the plane of the figure. The angle of inclination to the vertical of the axis X—X of the column can reach a maximum predetermined value $\alpha_0$ at least equal to 5°, and typically comprised between 5° and 10°. Within this range of oscillation, the column must ensure satisfactory distillation.

FIG. 1 shows schematically the internal arrangement of the upper portion of the column 1. This upper portion comprises a superposition of stacks 3 of cross-corrugated packing, of which each is in the form of a cylindrical cake occupying all the cross section of the column.

Each pack 3 (FIG. 2) is constituted of a stack of corrugated strips 4 with oblique corrugations 5, these strips being if desired perforated over all their surface. Each strip 4 comprises a generally vertical plane, all the strips have the same height, and the corrugations are alternately inclined in opposite directions from one strip to the next. Thus, the corrugations of adjacent strips touch at a large it number of points of intersection.

There are provided two types of packs 3: packs 3A whose strips 4A are oriented parallel to the preferred direction of oscillation F, which is to say to the plane of FIG. 1, and packs 3B whose strips 4B are oriented perpendicular to the strips 4A. All the packs 3 have the same number of strips 4, but the packs 3B are of greater number than the packs 3A. In this example, the packs 3B are twice as numerous as the packs 3A: the upper pack is a pack 3A, then, moving downwardly, there are two packs 3B, a pack 3A, two packs 3B, etc . . . Of course, this arrangement can be repeated along the length of the distillation column, which is to say of the low pressure column and of the medium pressure column, when, as in this example, there is a double air distillation column.

Then the liquid, which descends in the column, distributed at the head of the column over all the section of this latter by a distributor 6, flows for the most part over the perpendicular strips with the direction F, which are effectively opposed to the deflection of the liquid in the direction of inclination. The packs 3A oppose this deflection less, but their presence is necessary to ensure a redistribution of the liquid perpendicular to the strips 3A at several levels of the column.

Generally speaking, the number of packs 3B can be comprised between about ⅔ and ¾ of the total number of packs.

The ability of the packing to resist deflection of the liquid under the influence of oscillation, can be characterized as a value called the "deflection factor of the liquid", equal to d/i, wherein d designates the mean angle of deflection of the liquid relative to the axis X—X of the column whilst i designates the angle of inclination of this axis to the vertical (FIG. 3).

It can be shown that this deflection factor is proportional to the mean M of the cosines of the angles which comprise the assembly of the strips 4A and 4B, with the direction F, these cosines being taken at an absolute value. The proportionality factor depends only on the type of packing used.

With the conventional arrangement, with packs 3A and 3B in alternation, the mean M is 0.5 when the direction F corresponds to one of the two orientations of the strips, and is greater than 0.5 for any other direction F. For example, M=0.71 for an inclination whose plane makes an angle $\theta$=45° with those of the corrugated strips.

In FIGS. 4 and 5, $\theta$ designates the angle of the plane of oscillation with a reference plane, whose trace is superposed horizontally.

FIG. 4 corresponds to the arrangement of two packs 3B-a pack 3A described above. $\theta$=0 is the direction of the strips 4A. In this case, for $\theta$=0, M=0.33; for $\theta$=45°, M=0.71; and for $\theta$=90°, M=0.67. Thus, the deflection factor is reduced when the preferential oscillation direction F is chosen, such that $\theta$=0, or a nearby direction.

As a variant, other arrangements can lead to a reduced deflection of liquid. Thus, in the example of FIG. 5, the packs make alternately an angle x=+60° and x=−60° with the reference direction $\theta$=0. In this case, $\theta$=0 produces M=0.5, $\theta$=30° produces M=0.43 and $\theta$=90° produces M=0.87. It will be seen that the deflection factor is reduced when the preferred direction of oscillation F is selected such that $\theta$=30°, or a close-by direction. There are of course here two directions F which are symmetrical and which are suitable.

There will now be described, with respect to FIGS. 6 to 10, the construction of the lower edge of the strips 4A and 4B.

Seen edgewise (FIG. 6), each corrugation has a generally triangular shape, with straight sides 7 symmetrical to the vertical direction D and rounded sides 8 at the peaks of the corrugations. The corrugation is defined by its total height H, measured parallel to the direction D, by its opening angle $\gamma$ at the peaks, and by the radius r of the curves 8.

Seen face on (FIG. 7), each strip 4 is a rectangle whose corrugations 8 are inclined at an angle $\delta$ relative to the horizontal.

Figure 8:
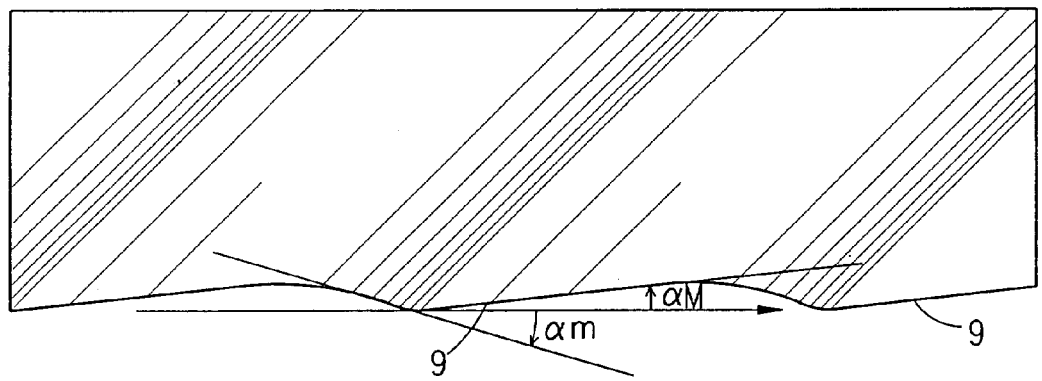
FIG. 8 shows on an enlarged scale the lower edge of a strip of the packing.

When the flat metal starting sheet is bent at the angle $\delta$, by winding on a suitable oblique mandrel, the upper and lower edges have the form of saw teeth, as shown in FIG. 8 for the lower edge. There is thus, seen face on, on the lower edge, a series of protuberances 9 projecting downwardly. Relative to the horizontal direction oriented to the right, the tangent to the contour of the projections evolves between a negative minimum $\alpha_m$ and a positive maximum $\alpha_M$.

When the liquid which wets the corrugated strip Sreaches its lower edge, each protuberance 9 constitutes a low point which permits dripping of the liquid on the lower pack and prevents displacement toward the end of the strip. So that this phenomenon will take place no matter what the inclination of the axis of the column, and in no matter what direction, until the angle $\alpha_0$, mentioned above is reached ($\alpha_0$ is equal to or greater than 5°), the parameters H, r, $\gamma$ and $\delta$ are so selected that:

$$-\alpha_m > \alpha_0 \text{ and } \alpha_M > \alpha_0.$$

This can be obtained from the following condition:

$$\frac{\sin\delta \cdot \tan\mu \cdot \sin(\frac{\gamma}{2}) + \cos\delta}{\sqrt{1 + \tan^2\mu \cdot \sin^2(\frac{\gamma}{2})}} < \cos\alpha_0,$$

wherein, $$\tan\mu = \tan\delta \cdot \frac{\left[r \cdot \sin(\frac{\gamma}{2}) + \frac{H}{2} - r\right] + \frac{\pi}{180} \cdot (90 - \frac{\gamma}{2}) \cdot r}{\sin(\frac{\gamma}{2}) \cdot \left[r \cdot \sin(\frac{\gamma}{2}) + \frac{H}{2} - r\right] + \cos^2(\frac{\gamma}{2}) \cdot r}$$

Figure 9:
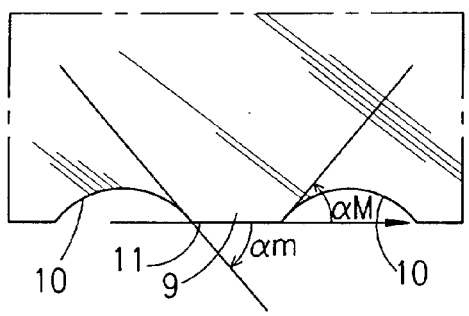
FIGS. 9 and 10 show schematically two modifications.
Figure 10:
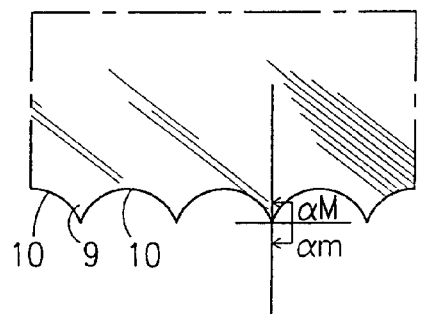

As shown in FIGS. 9 and 10, the existence of low points along the lower edge of the strips 4, for the on-board column, can also be obtained by providing on this lower edge, before bending the metal sheet, a series of recesses 10 each having a suitable profile: arc of a circle or ellipse as shown, but also polygons, etc . . . These recesses 10, which delimit between them the protuberances 9, can be separated from each other by rectilinear sections (FIG. 8), or adjacent each other (FIG. 9).

In the case of FIG. 9, $-\alpha_m = \alpha_M = 45°$, and, in FIG. 10, $-\alpha_m = \alpha_M = 90°$. These values change somewhat after bending the sheet, but remain very much higher than the values $\alpha_0$ designated for the use in question, which are comprised between about 5 and 10° as indicated above.

As will be understood, the invention is applicable also to fixed distillation columns but whose axis is not exactly vertical.

What is claimed is:

1. A corrugated strip for use as a cross-corrugated packing in a distillation column, the corrugated strip comprising on its lower edge, seen face on, at least one downwardly projecting motif whose contour is such that, if $\alpha_m$ and $\alpha_M$ designate the extremes of the algebraic value of the angle that the tangent of the contour, oriented in one direction of said lower edge forms with a horizontal line oriented in said one direction, then $-\alpha_m > \alpha_0$ and $\alpha_M > \alpha_0$, wherein $\alpha_0$ designates a predetermined angle equal at least to 5°; and wherein each motif is obtained by bending a flat strip to form a corrugation of height H, opening angle $\gamma$ and radius r at the peak of the corrugation, with the generatrices of the corrugations inclined at an angle $\delta$ seen face on, the parameters H, $\gamma$, r and $\delta$ being selected such that $$\frac{\sin\delta \cdot \tan\mu \cdot \sin(\frac{\gamma}{2}) + \cos\delta}{\sqrt{1 + \tan^2\mu \cdot \sin^2(\frac{\gamma}{2})}} < \cos\alpha_0,$$

wherein $$\tan\mu = \tan\delta \cdot \frac{\left[r \cdot \sin(\frac{\gamma}{2}) + \frac{H}{2} - r\right] + \frac{\pi}{180} \cdot (90 - \frac{\gamma}{2}) \cdot \cos(\frac{\gamma}{2})r}{\sin(\frac{\gamma}{2}) \cdot \left[r \cdot \sin(\frac{\gamma}{2}) + \frac{H}{2} - r\right] + \cos^2(\frac{\gamma}{2}) \cdot r}.$$

2. The corrugated strip according to claim 1, wherein the motif repeats a plurality of times along the lower edge of the strip, the motifs being adjacent each other or separated by substantially straight segments.

3. The corrugated strip according to claim 1, wherein each motif is obtained by cutting out two recesses in the lower edge of the strip before bending the strip.

4. A corrugated strip for use as a cross-corrugated packing in a distillation column, the corrugated strip comprising on its lower edge, seen face on, at least one downwardly projecting motif whose contour is such that, if $\alpha_m$ and $\alpha_M$ designate the extremes of the algebraic value of the angle that the tangent of the contour, oriented in one direction of said lower edge forms with a horizontal line oriented in said one direction, then $-\alpha_m > \alpha_0$ and $\alpha_M > \alpha_0$, wherein $\alpha_0$ designates a predetermined angle equal at least to 5°; and wherein each motif is obtained by bending a flat strip to form a corrugation of height H, opening angle $\gamma$ and radius r at the peak of the corrugation, with the generatrices of the corrugations inclined at an angle $\delta$ seen face on, the parameters H, $\gamma$, r and $\delta$ being selected such that $$\frac{\sin\delta \cdot \tan\mu \cdot \sin(\frac{\gamma}{2}) + \cos\delta}{\sqrt{1 + \tan^2\mu \cdot \sin^2(\frac{\gamma}{2})}} < \cos\alpha_0,$$

wherein, $$\tan\mu = \tan\delta \cdot \frac{\left[r \cdot \sin(\frac{\gamma}{2}) + \frac{H}{2} - r\right] + \frac{\pi}{180} \cdot (90 - \frac{\gamma}{2}) \cdot \cos(\frac{\gamma}{2})r}{\sin(\frac{\gamma}{2}) \cdot \left[r \cdot \sin(\frac{\gamma}{2}) + \frac{H}{2} - r\right] + \cos^2(\frac{\gamma}{2}) \cdot r}$$

thereby to ensure that liquid distributed at the head of the distillation column substantially wets the corrugated strip inclined at said predetermined angle $\alpha_0$.

5. A corrugated strip mounted in a cross-corrugated packing installed in a distillation column whose axis may incline up to a predetermined angle $\alpha_0$ equal at least to 5°, the corrugated strip comprising on its lower edge, seen face on, at least one downwardly projecting motif whose contour is such that, if $\alpha_m$ and $\alpha_M$ designate the extremes of the algebraic value of the angle that the tangent contour, oriented in one direction of said lower edge, forms with a horizontal line oriented in said one direction, then $-\alpha_m > \alpha_0$ and $\alpha_M > \alpha_0$;

wherein each motif is obtained by bending a flat strip to form a corrugation of height H, opening angle $\gamma$ and radius r at the peak of the corrugation, with the generatrices of the corrugations inclined at an angle $\delta$ seen face on, the parameters H, $\gamma$, r and $\delta$ being selected such that $$\frac{\sin\delta \cdot \tan\mu \cdot \sin(\frac{\gamma}{2}) + \cos\delta}{\sqrt{1 + \tan^2\mu \cdot \sin^2(\frac{\gamma}{2})}} < \cos\alpha_0,$$

wherein $$\tan\mu = \tan\delta \cdot \frac{\left[r \cdot \sin(\frac{\gamma}{2}) + \frac{H}{2} - r\right] + \frac{\pi}{180} \cdot (90 - \frac{\gamma}{2}) \cdot \cos(\frac{\gamma}{2})r}{\sin(\frac{\gamma}{2}) \cdot \left[r \cdot \sin(\frac{\gamma}{2}) + \frac{H}{2} - r\right] + \cos^2(\frac{\gamma}{2}) \cdot r}.$$

6. A distillation column, comprising a superposition of cross-corrugated packing sections having at least two different angular orientations, at least one of the sections including a stack of vertical corrugated strips of which at least one is structured according to claim 1, with their corrugations inclined alternately in opposite directions, there being at least one first direction such that the mean of the cosines of the angles which an assembly of the strips of the sections form with said first direction, the cosines having an absolute value, is less than 0.5.

7. The distillation column according to claim 6, wherein the distillation column is on board a floating structure having a preferred direction of oscillation, the first direction being said preferred direction of oscillation.

8. The distillation column according to claim 7, wherein the superposition of stacks is constituted by sections with strips parallel to the preferred direction of oscillation and by sections with strips perpendicular to said preferred direction; the number of perpendicular strips being between about ⅔ and ¾ of the total number of sections of said superposition of sections.

* * * * *